Sept. 5, 1967 R. J. EMINGER 3,340,029
TOOLING FOR WINDING DYNAMOELECTRIC MACHINE CORE MEMBERS
Filed Sept. 2, 1965 4 Sheets-Sheet 1
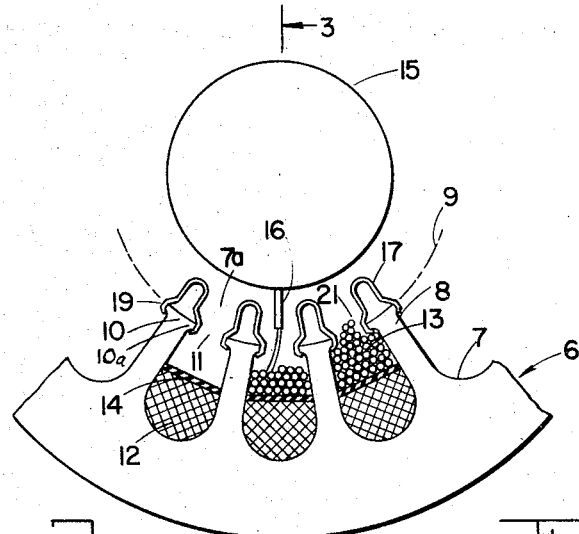
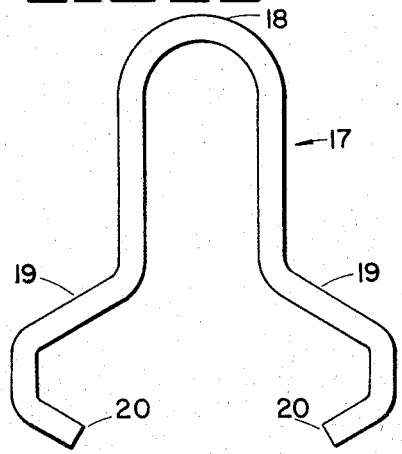
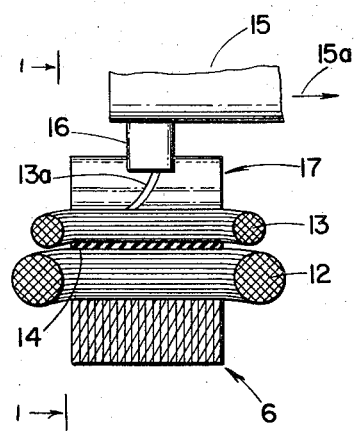
INVENTOR
ROBERT J. EMINGER
BY Hood, Gust & Irish
ATTORNEYS Sept. 5, 1967 R. J. EMINGER 3,340,029
TOOLING FOR WINDING DYNAMOELECTRIC MACHINE CORE MEMBERS
Filed Sept. 2, 1965 4 Sheets-Sheet 2

INVENTOR
ROBERT J. EMINGER
BY Hood, Gust & Irish
ATTORNEYS

Sept. 5, 1967 R. J. EMINGER 3,340,029
TOOLING FOR WINDING DYNAMOELECTRIC MACHINE CORE MEMBERS
Filed Sept. 2, 1965 4 Sheets-Sheet 4
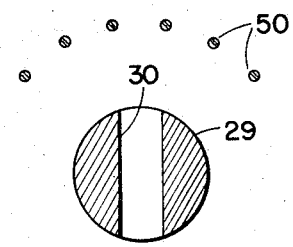
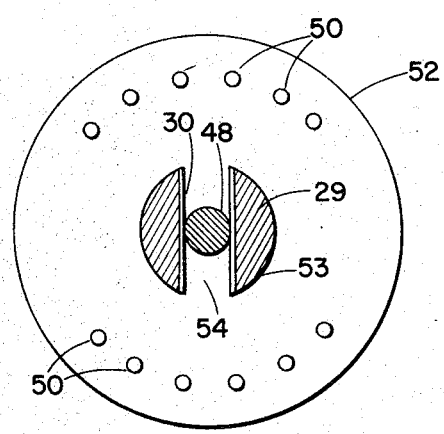
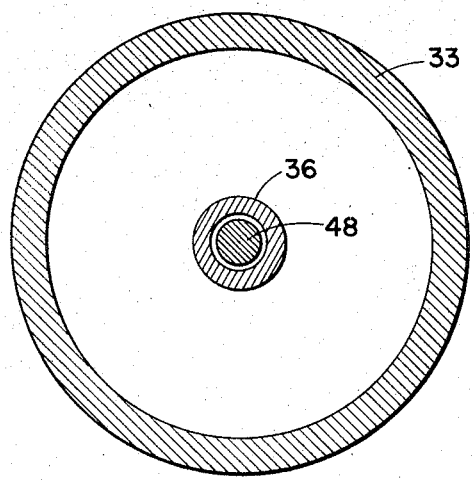
INVENTOR
ROBERT J. EMINGER
BY Wood, Guet & Irish
ATTORNEYS United States Patent Office 3,340,029
Patented Sept. 5, 1967

3,340,029
TOOLING FOR WINDING DYNAMOELECTRIC MACHINE CORE MEMBERS
Robert J. Eminger, Fort Wayne, Ind., assignor to Fort Wayne Tool & Die, Inc., Fort Wayne, Ind., a corporation of Indiana
Filed Sept. 2, 1965, Ser. No. 484,582
10 Claims. (Cl. 29—205)

This invention relates generally to the winding of coils into the slots of dynamoelectric machine core members, and more particularly to apparatus for attaching and removing tooth extending members on the ends of the teeth of a dynamoelectric machine core member.

The field windings of certain dynamoelectric machines, such as single phase alternating current motors, are conventionally wound in the slots of the stator core member with a gun type winding machine. A gun type winding machine commonly comprises a winding head having a wire dispensing needle extending outwardly therefrom, the head and needle being moved reciprocally through the bore of the core and oscillated at the respective ends of its stroke thereby to wind a coil in a pair of stator slots.

The wire dispensing needle conventionally extends into and moves through the core slots during the winding operation thereby to ensure that the wire dispensed thereby is laid directly into the slots. However, with this arrangement, it has been impossible completely to fill the slots with wire, a desirable condition for optimum efficiency in certain dynamoelectric machine designs. While other types of winding machines will provide greater slot fill, gun type winding machines are frequently preferred by reason of their high speed operation.

In application Ser. No. 484,887, filed Sept. 3, 1965 of Buddy S. Stuckey, assigned to the assignee of the present application, there are described and illustrated tooth extension members respectively removably secured to the ends of adjacent stator core member teeth and extending radially inwardly therefrom into the bore so as to define extensions of the respective winding slots therebetween. With the use of such tooth extension members, the wire dispensing needle of the winding machine extends into and moves through the slot extensions during the winding operation rather than extending into and moving through the stator core slots themselves, thus securing greater slot fill than has heretofore been obtainable.

The tooth extension members of the aforesaid Stuckey application may be attached to and removed from the stator core member teeth by hand; however, it is desirable to provide apparatus for simultaneously attaching all of the tooth extension members prior to the winding operation and thereafter simultaneously to remove all of the tooth extension members thereby greatly reducing the time involved in this phase of the winding operation.

It is accordingly an object of the invention to provide apparatus for attaching tooth extension members on the ends of the teeth of a dynamoelectric machine core member and for removing the same therefrom.

The above-mentioned and other features and objects of this invention and the manner of attaining them will become more apparent and the invention itself will be best understood by reference to the following description of an embodiment of the invention taken in conjunction with the accomanying drawing, wherein:

FIG. 1 is a fragmentary end view, taken generally along the line 1—1 of FIG. 3, illustrating a dynamoelectric machine stator core member during winding by a gun type winding machine and having tooth extension members assembled thereon;

FIG. 2 is an enlarged end view of the tooth extension member of FIG. 1;

FIG. 3 is a fragmentary cross-sectional view taken along the line 3—3 of FIG. 1;

FIG. 7 is a fragmentary cross-sectional view taken along the line 7—7 of FIG. 4;

FIG. 8 is a fragmentary cross-sectional view taken along the line 8—8 of FIG. 4; and FIG. 9 is a fragmentary cross-sectional view taken along the line 9—9 of FIG. 4.

Figure 4:
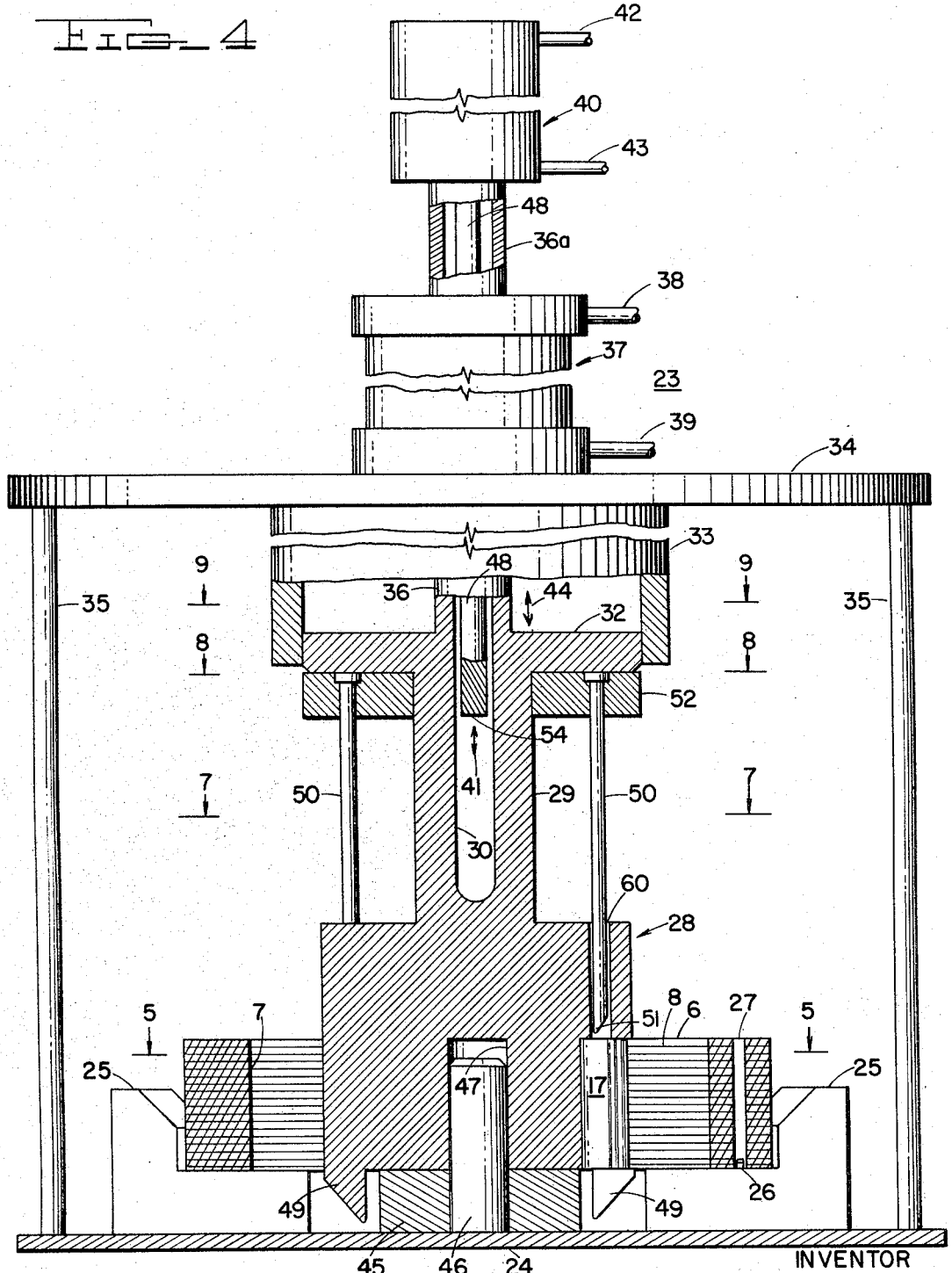
FIG. 4 is a side view, partly in cross-section and partly broken away, illustrating the apparatus of the invention for attaching and removing the tooth extension members.

Referring now to FIGS. 1, 2 and 3 of the drawings, there is shown a conventional dynamoelectric machine stator core member 6 having a plurality of radially inwardly extending winding slots 7 formed therein respectively defined by radially inwardly extending teeth 8 having inner ends 10 which define the central bore 9, the tooth ends 10 respectively having side portions 10a respectively defining neck portions 11 of the slots 7 which communicate with the bore 9 and are respectively narrower than the radially outwardly extending portions of the slots.

The field coils for the dynamoelectric machine, which may be a single phase, alternating current motor having main or running windings 12 and auxiliary or starting windings 13, are wound into the slots 7 by a conventional gun type winding machine having a winding head 15 with a wire dispensing needle 16 extending radially outwardly therefrom. The gun type winding machine may be of the type described and illustrated in Patent No. 3,025,008 of Richard G. Nill and Robert J. Eminger assigned to the assignee of the present application.

In FIG. 1, the main windings 12 are shown already wound in the slots 7 with conventional phase insulation 14 thereover. A plurality of tooth extension members 17 are provided respectively formed of relativey thin gauge spring metal, such as spring steel. Tooth extension members 17 are generally U-shaped in configuration having bight portions 18 and clip portions 19 formed adjacent ends 20 of their legs. Tooth extenders 17 are respectively assembled on the ends 10 of the stator core teeth 8 and extend radially inwardly into the bore 9, the clip portions 19 respectively resiliently engaging the side portions 10a of each tooth, as best seen in FIG. 1.

It will be seen that each adjacent pair of tooth extension members 17 respectively define an inwardly extending extension 7a of the respective winding slot 7. As seen in FIGS. 1 and 3, winding head 15 of the winding machine moves within the tooth extenders 17 with its wire dispensing needle 16 extending into and moving through the slot extension 7a, but not extending through the neck portions 11 and actually into the slot 7, as previously has been the practice. Referring particularly to FIG. 3, it will be seen that as the winding head 15 is moved into the direction as shown by the arrow 15a, wire dispensing needle 16 will lay the wire 13a forming the start winding coil 13 in the respective slots 7 over the respective main winding coil 12 and phase insulator 14, the wire 13a being guided into the slot by the adjacent pair of tooth extenders 17. In this way, the portion of the respective slots 7 over the main winding 12 and phase insulator 14 can be substantially filled with wire forming the start winding 13.

It will be understood that as the respective slot 7 is filled with the wire 13a forming the start winding 13, some of the radially inner turns will tend to bulge or spill radially inwardly through the neck portion 11 and into the bore 9, as shown at 21 in FIG. 1. However, it will be observed that these turns 21 are still disposed between the adjacent pair of tooth extenders 17. These turns 21 are, however, forced back into the slots to form a tightly compacted winding 13 by subsequent insertion of the conventional slot wedges or top sticks, as is well known to those skilled in the art.

Referring now to FIGS. 4 through 9 inclusive, the apparatus for attaching the tooth extenders 17 on the ends 10 of the stator core teeth 8 and subsequently removing the tooth extenders therefrom is shown, generally indicated at 23. A base plate member 24 is provided having a plurality of supports 25 for receiving and supporting the stator core member 6. The stator core member 6 is preferably properly located by means of a pin 26 on one of the supports 25 received within a locating hole 27 in the core.

A tooth extender receiving member 28 is provided which is vertically movable between a lower operating position in the bore of the stator core member 6, as shown in FIG. 4, and an upper loading position (not shown) above the stator core member 6.

Receiving member 28 is attached to a vertically upwardly extending rod member 29 having a transverse slot 30 formed therethrough for a purpose to be hereinafter described. Rod member 29 is attached to a plate member 32 which is guided for vertical movement by a sleeve member 33. The upper end of sleeve member 33 is attached to an upper plate member 34 which is spaced vertically above and secured to the bottom plate member 24 by suitable post members 35.

A sleeve member 36 is secured to the plate member 32 and extends vertically upwardly therefrom through the sleeve member 33 and an aperture (not shown) in the top plate member 34.

A conventional double-acting hydraulic cylinder 37 is provided mounted on top plate 34 and extending upwardly therefrom. Sleeve 36 extends through the hydraulic cylinder 37, forming the piston rod thereof, and is thereby selectively moved by the hydraulic cylinder 37 upwardly and downwardly, as shown by the arrows 44, thereby to move the receiving member 28 between its lower operating position and its upper loading position. Hydraulic fluid inlet and outlet lines 38, 39 are connected to the hydraulic cylinder 37 and adapted to be connected to appropriate valving, as is well known to those skilled in the art.

Sleeve member 36 has an extension 36a extending upwardly above the hydraulic cylinder 37. Another conventional hydraulic cylinder 40 is mounted on the sleeve extension 36a and is thus vertically movable in response to movement of the sleeve member 36. Hydraulic fluid lines 42, 43 are connected to the hydraulic cylinder 40 and are adapted to be connected to conventional valving (not shown) for selectively actuating hydraulic cylinder 40.

A member 45 on the plate member 24 limits the downward movement of the receiving member 28 and a vertically upwardly extending pin 46 is received within aperture 47 in the receiving member 28 when in its lower position thereby properly to locate the receiving member.

Hydraulic cylinder 40 is provided with a piston rod 48 which extends downwardly through the sleeve member 36. Selective actuation of the hydraulic cylinder 40 will therefore actuate the rod 48 vertically upwardly and downwardly, as shown by the arrows 41 independently of the vertical movement and position of the sleeve 36 responsive to the actuation of the hydraulic cylinder 37.

Figure 5:
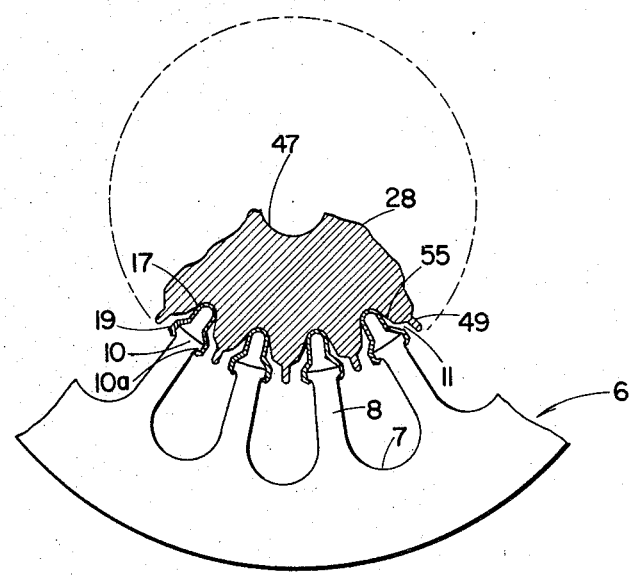
FIG. 5 is a fragmentary cross-sectional view taken along the line 5—5 of FIG. 4.
Figure 6:
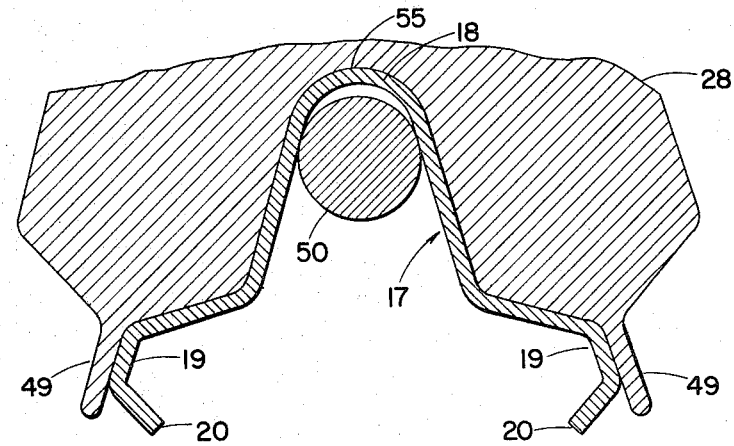
FIG. 6 is an enlarged fragmentary, cross-sectional view also taken along the line 5—5 of FIG. 4 and showing the operation of the apparatus of the invention.

Referring particularly to FIGS. 5 and 6, receiving member 28 has a plurality of recesses 55 formed in its periphery respectively in radial alignment with the teeth 8 of the stator core member 6, recesses 55 being defined by projections 49 which are respectively in radial alignment with the neck portions 11 of the winding slots 7. As best seen in FIG. 5, when the receiving member 28 is in its lower position, projections 49 extend into winding slots 7 through the neck portions 11. Recesses 55 respectively receive the tooth extension members 17.

A plurality of vertically extending pins 50 are provided vertically movable in openings 60 formed in the receiving member 28 respectively in vertical alignment with the recesses 55. Each of the pins 50 has its lower end 51 pointed for a purpose to be hereinafter described. The upper ends of the pins 50 are respectively mounted on an annular plate member 52 which surrounds the rod member 29 and is vertically movable thereon. A transverse cross bar member 54 is provided attached to the lower end of the rod 48 and extending through the slot 30 in rod member 29, cross bar member 54 having its opposite ends respectively affixed to the annular member 52. Annular member 52 and pins 50 are thus vertically movable by piston rod 48 in response to actuation of the hydraulic cylinder 40.

Referring now particularly to FIGS. 2 and 6, FIG. 2 shows the tooth extension members 17 in their normal condition, i.e., as they appear when attached to the tooth ends 10. When the tooth extension members 17 are respectively loaded in the recesses 55 in the receiving member 28 and the pins 50 are moved downwardly by annular member 52 and piston rod 48 in response to actuation of hydraulic cylinder 40, ends 51 of the pins enter the spaces between the leg portions of the tooth extension members and continued downward movement of the pins 50 separates the leg portions, as best seen in FIG. 6. The pins 50 thus bias the leg portions of the tooth extenders 17 against the walls of the recesses 55 thereby retaining the tooth extenders 17 in the recesses 15 and separating the clip portions 19 to permit the tooth extenders 17 to be moved downwardly over the tooth ends 10 of the stator core teeth 8 as the receiving member 28 is moved downwardly.

In operation, receiving member 28 is initially in its upper position and pins 50 are likewise in their upper position. The pins 50 are then moved downwardly to their lower position in which they extend downwardly through the recesses 55 by selective actuation of the upper hydraulic cylinder 40. The tooth extension members 17 are then manually inserted in the recesses 55 in receiving member 28 by upward movement from the bottom side thereof. It will be seen that with the pins 50 in their lower positions, this manual upward movement of the tooth extension members 17 in the recesses 55 will cause the leg portions to be separated and the tooth extension members 17 thus retained in the recesses 55. A stator core member 6 is then positioned on the supporting members 25 and properly located by means of the pin 26.

Hydraulic cylinder 37 is then actuated to move the receiving member 28 with the tooth extension members 17 therein retained by the pins 50 in their lower positions downwardly into the bore of the stator core member 6. It will be seen that with the clip portions 19 of the tooth extension members 17 separated by the pins 50, the clip portions 19 will respectively pass by the projections 10a on the sides of the tooth ends 10. It will further be seen that since the upper hydraulic cylinder 40 is mounted on the sleeve member 36 which is the piston rod of the lower hydraulic cylinder 37, actuation of the hydraulic cylinder 37 to move the sleeve 36 downwardly will result in simultaneous downward movement of hydraulic cylinder 40 and thus the pins 50. When the sleeve 28 is in its lower position engaging the stop member 45, clip portions 19 of the tooth extension member 17 will respectively embrace but not engage the projections 10a of the tooth ends 10.

Hydraulic cylinder 40 is then actuated to move piston rod 48, annular member 52 and pins 50 upwardly thus withdrawing pins 50 from the tooth extension member 17 to the position shown in FIG. 4. When the pins 50 are fully withdrawn from the tooth extension member 17, the tooth extension members are resiliently returned to their normal positions as shown in FIG. 2 with the clip portions 19 resiliently engaging the projections 10a on the sides of the tooth ends 10. Hydraulic cylinder 37 is then actuated to move the receiving member 28 upwardly out of the bore of the stator core member 6 thus leaving the tooth extension members 17 attached to the tooth ends 10 of the stator core member 6. The stator core member 6 with the tooth extension members 17 thus attached to the tooth ends 10 of the teeth 8 is then removed from the apparatus, placed in the winding machine, and the windings appropriately wound in the slots 7.

The fully wound stator core member is then returned to the apparatus 23 and again placed on the supports 25. The hydraulic cylinder 37 is then actuated to move the receiving member 28 downwardly into the bore with the tooth extension members 17 thus being received within the recesses 55, as shown in FIG. 5. The hydraulic cylinder 40 is then actuated to move the pins 50 downwardly into the tooth extension members 17 thus separating the leg portions thereof and moving them into engagement with the walls of the recesses 55, the clip portions 19 thus moving out of engagement with the projections 10a on the tooth ends 10. The hydraulic cylinder 37 is then actuated to move receiving member 28 and the pins upwardly, it being recalled that hydraulic cylinder 40 is mounted on extension 36a of the sleeve 36, the tooth extension members 17 thus retained in the recesses 55 being thereby vertically removed from the tooth ends 10 of the stator core member 6. The stator core member 6 with the windings therein and the tooth extension members 17 removed therefrom is then removed from the support members 25. It will be seen that following removal of the tooth extension members 17 from the tooth ends 10, as above described, the tooth extenders are retained in the recesses 55 in the receiving member 28 by the pins 50.

It will now be seen that once the tooth extension members 17 are initially loaded in the recesses 55 of the receiving member 28, no further hand operations are required, the tooth extension members 17 being either attached to a stator core member 6 which is being wound, or retained in the recesses 55 of the receiving member 28 in its upper position pending attachment to a new stator core member 6. It will thus be seen that with the apparatus of the invention, the tooth extension members are simultaneously attached to the teeth of a stator core member and thereafter simultaneously removed, thereby eliminating the necessity individually to attach and remove each tooth extension member from a respective tooth end.

While there have been described above the principles of this invention in connection with specific apparatus, it is to be clearly understood that this description is made only by way of example and not as a limitation to the scope of the invention.

What is claimed is:

1. Apparatus for attaching a tooth extending member on the end of a tooth of a dynamoelectric machine core member and for removing the same theerfrom, said tooth extending member being generally U-shaped with its leg portions normally spaced so that the ends thereof respectively resiliently engage said tooth end, said apparatus comprising: means for receiving said tooth extending member; and means selectively insertable between said leg portions for separating the same while said tooth extending member is in said receiving means whereby said tooth extending member may be attached to and removed from said tooth end.

2. The apparatus of claim 1 wherein said receiving means comprises a member having a recess therein proportioned to receive said tooth extending member.

3. The apparatus of claim 1 wherein said separating means comprises an elongated rod element, and means for selectively moving said rod element into and out of the space between said leg portions in a direction generally at right angles to the common plane of said leg portions, said rod element having a transverse dimension greater than the normal space between said leg portions whereby said leg portions are separated upon insertion of said rod element.

4. The apparatus of claim 1 further comprising means for selectively moving said receiving means to and from a position with said tooth extending member in facing alignment with said tooth end.

5. The apparatus of claim 1 wherein said core member has a bore formed therein with said tooth extending inwardly toward the same and said tooth end defining said bore, and wherein said receiving means comprises a movable member having means thereon for receiving said tooth extending member, means for selectively moving said movable member into and out of said bore in a direction parallel with the axis thereof, said movable member when in said bore positioning said tooth extending member in facing alignment with said tooth end.

6. The apparatus of claim 5 wherein said movable member has a recess formed therein for receiving said tooth extending member, wherein said separating means comprises an elongated rod element, and means for selectively moving said rod element into and out of the space between said leg portions in a direction parallel with said core member axis, said rod element when inserted in said space retaining said tooth extending member in said recess, said rod element having a transverse dimension greater than the normal space between said leg portions whereby said leg portions are separated upon insertion of said rod element.

7. The apparatus of claim 1 wherein said core member has a bore and radially inwardly extending winding slots formed therein communicating with said bore, two adjacent slots defining said tooth, said tooth end defining said bore, wherein said receiving means comprises a movable member having a recess formed therein for receiving said tooth extending member, means for selectively moving said movable member into and out of said bore in a direction parallel with the axis thereof, said recess facing said tooth end when said movable member is in said bore whereby said tooth extending member is positioned in facing alignment with said tooth end, wherein said separating means comprises an elongated rod element and means mounting said rod element on said movable member for selective movement into and out of the space between said leg portions in a direction parallel with said core member axis, said rod element when inserted in said space retaining said tooth extending member in said recess, said rod element having a transverse dimension greater than the normal space between said leg portions whereby said leg portions are separated upon insertion of said rod element.

8. The apparatus of claim 7 wherein said moving means comprises a first operating member attached to said movable member and extending parallel with said axis, and first selectively actuable hydraulic cylinder means coupled to said first operating member for moving the same and said movable member, wherein said mounting means comprises a member mounted on said first operating member for movement thereon, a second operating member attached to said last-named member, and second selectively actuable hydraulic cylinder means coupled to said second operating member for moving the same and said elongated rod.

9. The apparatus of claim 7 wherein said moving means comprises a first operating member attached to said movable member and extending parallel with said axis, said first operating member including an elongated rod portion adjacent said movable member and an elongated sleeve portion joined to said rod portion, said rod portion having an axially extending slot formed therein communicating with the interior of said sleeve portion, and a first selectively actuable hydraulic cylinder, said sleeve portion extending through said first cylinder and being actuated thereby for moving said movable member into and out of said bore, and wherein said mounting means comprises a mounting member mounted on said rod portion for movement thereon, said rod element being attached to said mounting member, another elongated rod extending through said sleeve portion, means extending through said slot for connecting said mounting member to said other rod, said sleeve portion extending beyond said first cylinder on the side thereof remote from said movable member, and a second selectively actuable hydraulic cylinder mounted on said sleeve portion extension and movable thereby, said other rod being coupled to said second hydraulic cylinder and actuated thereby for moving said mounting member and rod element.

10. The apparatus of claim 7 wherein said movable member has a pair of radially outwardly extending projections formed thereon defining said recess therebetween, said projections respectively extending into said adjacent core slots when said movable member is in said bore.

References Cited
UNITED STATES PATENTS

| | | | |
|---|---|---|---|
| 1,661,344 | 3/1928 | Poole | 29—205 |
| 2,873,515 | 2/1959 | Winstrom | 29—205 |

JOHN F. CAMPBELL, *Primary Examiner.*

THOMAS H. EAGER, *Examiner.*